(No Model.)
T. W. SPRAGUE.
DEHORNING IMPLEMENT.
No. 453,675. Patented June 9, 1891.
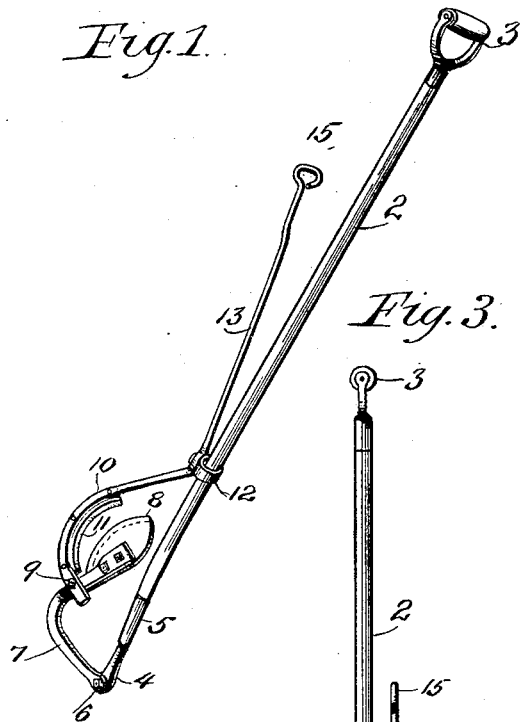
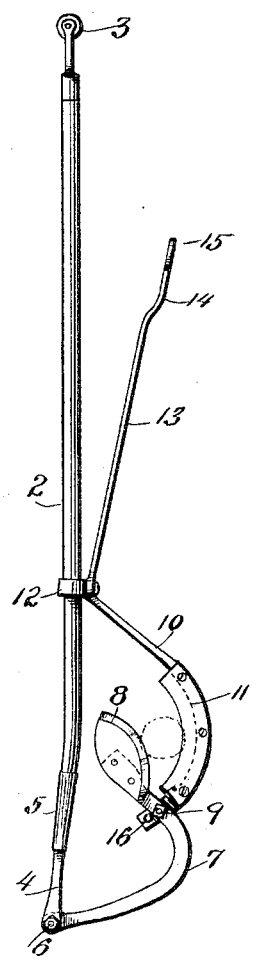
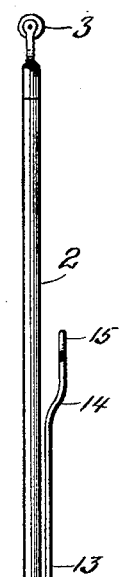
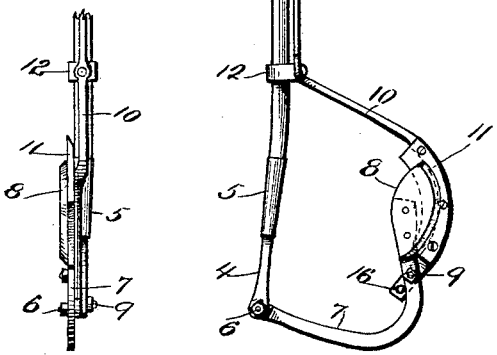
Witnesses
J. Jensen
C. H. Hawley
Inventor
Thomas W. Sprague
By Paul Summin Attys

UNITED STATES PATENT OFFICE.

THOMAS W. SPRAGUE, OF MINNEAPOLIS, MINNESOTA.

DEHORNING IMPLEMENT.

SPECIFICATION forming part of Letters Patent No. 453,675, dated June 9, 1891.

Application filed January 12, 1891. Serial No. 377,409. (No model.)

*To all whom it may concern:*

Be it known that I, THOMAS W. SPRAGUE, of Minneapolis, in the county of Hennepin and State of Minnesota, have invented certain Improvements in Dehorning Implements, of which the following is a specification.

My invention relates to a cattle-dehorning device adapted for use in dehorning cattle confined in a run or in a pen.
My invention consists in the construction and combination hereinafter described, and particularly pointed out in the claim.

The invention will be more readily understood by reference to the accompanying drawings, in which—

Figure 1 is a general perspective view of a dehorning implement embodying my invention. Fig. 2 is a side view of the device. Fig. 3 is a view of the other side of the same, and Fig. 4 is an edge view showing the relative positions of knives and their support.

As shown in the drawings, the handle 2 is provided with a cross-yoke or spade-handle 3, standing at right angles to the knife device at the lower or outer end of the implement. The lower end of the handle 2 is provided with the eye strap or pin 4, secured in place by the ferrule 5, the said end being bent slightly outward, so as to bring the pulling center of the knives as far into line with the inner end of the long handle 2 as possible. Pivoted in the eye-strap by a bolt or pin 6 is the convex knife-arm 7, shaped conveniently to accommodate the convex knife 8 and the pivot-pin 9, securing the other knife-arm 10 to the first arm. Upon the inner arm 10 is secured the concave knife 11, across which the convex knife is adapted to shut.

As shown, the upper or inner end of the knife-arm 10 is secured to the handle 2 by means of a ring 12 loosely engaging the same. From this ring the handle or supporting-arm 13 extends in toward the handle 3, standing, as shown in Fig. 3, away from the handle 2 when the knives are separated and easily enabling the operator to hold the knives in just the position desired and also keep the long handle from twisting around in his hand. The supporting-rod 13 is provided with a jog 14, throwing the hand-ring 15 out away from the pole 2. In order to prevent the knives from opening too far, I provide a pin or shoulder 16 in the lower end of the arm 10, adapted to engage the arm 7 when the rod 13 is pulled in to force the knives open.

As shown in Fig. 4, the knives 8 and 10 are beveled off at the same angle, so that sharp edges are presented and adapted to close tightly one over the other. It is obvious that the shape and arrangement of the several parts of the implement may be changed, so long as the general shapes of the knives and their relative positions with respect to one another are retained.

Heretofore many dehorning devices have been devised; but the common objections to them have been that their operation has been very tiresome to the person using them, for the reason that in addition to upholding the weight of the device the knives must be operated by the handles like those of a large pair of shears, or when a pole-handle has been used difficulty has been experienced, owing to the twisting of the same in the hands, and, further, that instead of cutting the horns clean away rough stumps have been left where the horn was broken off. I apprehend that in my device these difficulties are overcome, inasmuch as in the operation the use of the same, while the operator may stand at a considerable distance from the animal, he may easily place the knives over the horns, the opening between the two knives, the arm 10, and the section of the pole 2 being large enough to easily catch the horn, which, when the pole is drawn back, is forced into the wedge-shaped opening between the two knives. By this operation the soft horn is cut into a considerable distance, owing to the sliding cut that is obtained on the same. Then by pulling back strongly on the handle 3 and the pole 2 the convex knife is forced out toward the concave knife and the horn cut off, a smooth stump only being left on the head of the animal. As the knives close together the rod 13 is thrown in close to the handle 2. The knives are then opened by drawing back on the rod 13, which assumes a position with an angle to the pole 2 and forms as good a support to be grasped by the left hand of the operator as a long lateral handle or pin extending from the pole 2 would provide. The elliptical form is given to the knife-plate 8 as that embodying the greatest strength. It is obvious that such a form would not be required in the other knife, as the same is firmly supported by the curving arm 10.

Having thus described my invention, I claim as new and desire to secure by Letters Patent—

The combination, in a device of the class described, of a long pole-handle 2 and curved lever pivotally connected with said handle and provided with the convex knife 8, detachably secured to the end of said lever at one side thereof, a ring 12, arranged to slide upon the pole 2, the curved lever 10, secured to said ring and pivotally connected to the lever 7 at 9, the concave knife 11, detachably secured to one side of the lever 10 opposite said knife 8, and the rod 13, secured to the ring 12 and provided with a handle 15 at its end, all substantially as described.

In testimony whereof I have hereunto set my hand this 7th day of January, 1891.

THOMAS W. SPRAGUE.

In presence of—
L. D. HOBSON,
GERTRUDE SPERRY.